Sept. 27, 1927.
W. AAB
1,643,359
PISTON ALIGNING MACHINE FOR CONNECTING ROD ASSEMBLIES
Original Filed Oct. 5, 1925
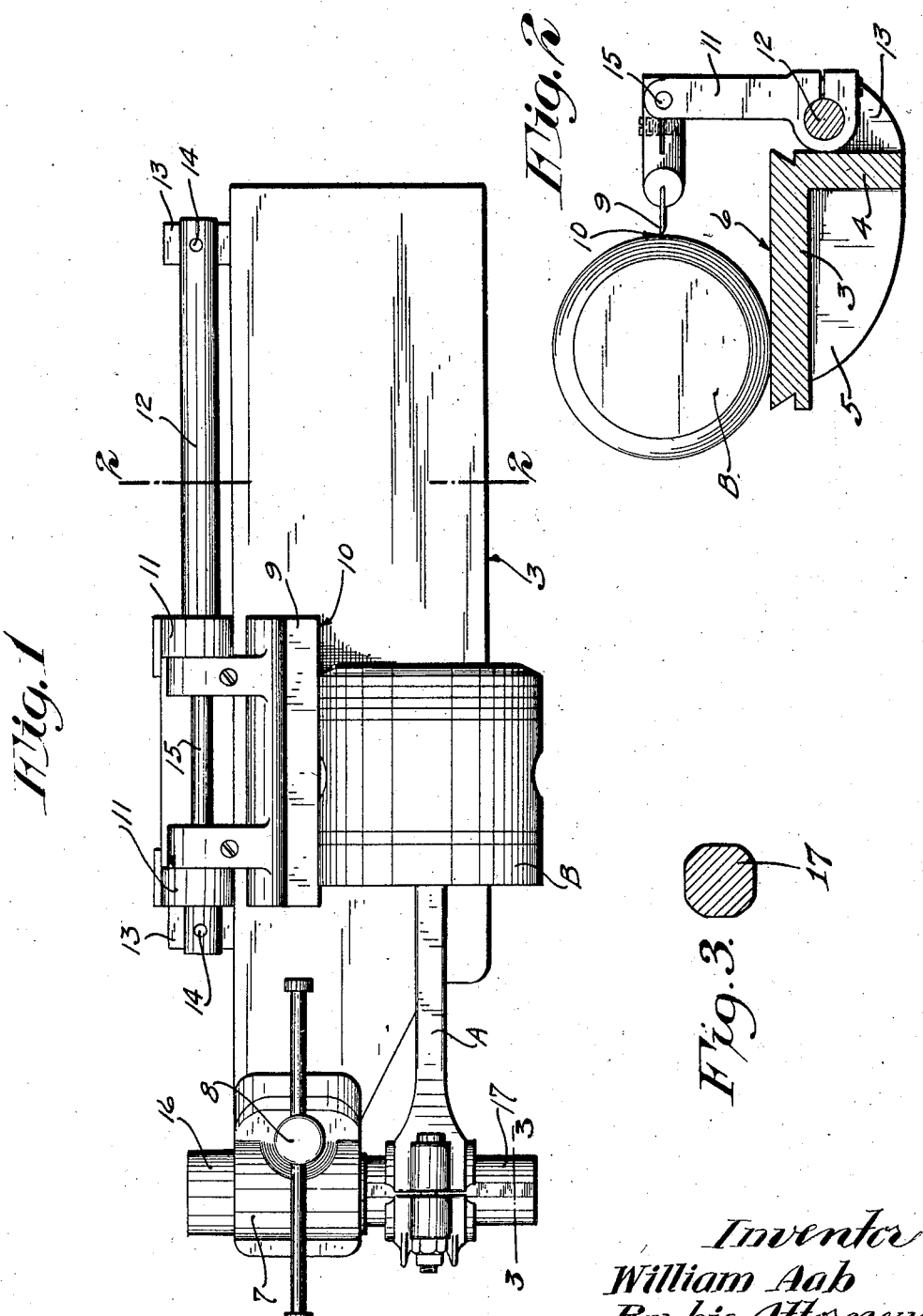
Inventor
William Aab
By his Attorneys
Merchant and Kiegore Patented Sept. 27, 1927.

1,643,359

UNITED STATES PATENT OFFICE.

WILLIAM AAB, OF NEW ULM, MINNESOTA.

PISTON-ALIGNING MACHINE FOR CONNECTING-ROD ASSEMBLIES.

Original application filed October 5, 1925, Serial No. 60,474. Divided and this application filed April 23, 1926. Serial No. 104,064.

My present invention has for its object to provide an extremely simple and highly efficient piston aligning machine for connecting rod assemblies of internal combustion engines and is in the nature of a division of my co-pending application entitled "Aligning machine for connecting rods and wrist pins of internal combustion engines" filed October 5, 1925, under Serial Number 60,474.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the machine having a connecting rod assembly mounted thereon;

Fig. 2 is a view partly in end elevation and partly in transverse vertical section taken on the line 2—2 of Fig. 1; and Fig. 3 is a detail view in cross section taken on the line 3—3 of Fig. 1.

The numeral 3 indicates a flat base having at its back a longitudinally extended flange 4 suitably reinforced by means of cross ribs 5. The top of the base 3 is planed true to afford a piston-supporting surface 6. The base 3 may be rigidly held in any suitable manner, such as by having its depending flange 4 clamped between the jaws of a vise. Formed with the base 3 at the left-hand end thereof is a fixed split bearing sleeve 7 having a turning-rod-equipped adjusting screw 8 for contracting the same. The axis of this bearing sleeve 7 extends parallel to the piston-testing surface 6.

A piston-aligning member 9 in the form of a straight edge or blade is secured to a bracket 11 mounted on a shaft 12 secured in open seats formed in lugs 13 on the back of the base flange 4 by means of screws 14. The outer longitudinal edge of the piston-aligning member 9 affords a piston-engaging portion 10 that extends in a plane parallel to the piston-supporting surface 6 and at right angles to the axis of the bearing sleeve 7. The bracket 11 is free for axial sliding movement on the shaft 12 and pivotal movement on said shaft. The bracket 11 is provided with an intermediate joint 15, the axis of which extends parallel to the axis of the shaft 12, whereby the bracket may be adjusted to support the piston aligning member 9 horizontally over the piston-supporting surface 6. Friction between the bracket 11 and shaft 12 and in the joint 15 is such that said bracket will stay where set. When not in use the bracket 11 may be turned into position back of the base 3 where the same will be entirely out of the way.

An arbor 16 is turnably mounted in the bearing sleeve 7 and has a forwardly projecting section 17 on which the crank end of a connecting rod A and its bushing may be mounted. This arbor section 17 is of a diameter that corresponds to the crank of the engine crank shaft for which the connecting rod A is designed. Preferably the arbor section 17 will be flattened on four sides so that only the four round corners thereof are engaged by the connecting rod bushing and hence will tightly hold bushings that vary slightly in diameter.

In actual commercial usage a plurality of arbors 16 having sections 17 of different diameters to correspond to the cranks of the different engine crank shafts will be provided for interchangeable use. Mounted on the connecting rod A is a piston B which completes the connecting rod assembly.

To test the piston B after being secured to the connecting rod by its wrist pin to determine whether or not the axis of said piston extends at right angles to the axis of the arbor 16, said piston is loosely laid on the supporting surface 6 at the base 3 so as to engage the same throughout its entire length. The wrist pin connection between the connecting rod A and piston B permits said piston to be thus supported on the surface 6. The bracket 11 is then adjusted to bring the piston-aligning member 9 into a horizontal position and with its piston-engaging portion 10 in engagement with said piston in the same horizontal plane as the axis of said piston, as shown in the drawings.

Said bracket 11 can be longitudinally adjusted on the shaft 12 so that the piston-engaging portion 10 will engage pistons on connecting rods of different lengths. By reference to Fig. 2 it will be noted that the bracket 11 and joint 15 are provided with split bearings having set screws by which said bearings can be adjusted to compensate for wear. In case the piston B does not engage the piston engaging portion 10 at both of its ends it will be necessary to bend the connecting rod A until such contact is possible. After a piston is aligned as above described its axis will extend at right angles to the arbor 16 and hence the crank shaft to which it is to be applied.

What I claim is:

1. A machine of the kind described having a base with a piston-supporting surface, an arbor on the base, and a piston-aligning member having a piston-engaging portion that extends in a plane parallel to the plane of said piston-supporting surface and at right angles to the axis of the arbor.

2. A machine of the kind described having a base with a piston-supporting surface, an arbor on the base, a bracket mounted on the base, and a piston-aligning member on said bracket having a piston-engaging portion that extends in a plane parallel to the plane of said piston-supporting surface and at right angles to the axis of the arbor, said bracket being adjustable to move the piston-engaging portion of said member parallel toward or from the piston-supporting surface on the base.

3. A machine of the kind described having a base with a piston-supporting surface, an arbor on the base, a bracket mounted on the base, and a piston-aligning member on said bracket having a piston-engaging portion that extends in a plane parallel to the plane of said piston-supporting surface and at right angles to the axis of the arbor, said bracket being adjustable to move the piston-aligning member at right angles toward or from the axis of the arbor.

4. A machine of the kind described having a base with a piston-supporting surface, an arbor on the base, a shaft on the base, the axis of which is in a plane parallel to said piston-supporting surface, the axes of said arbor and shaft being in vertical planes that intersect each other at right angles, and a bracket mounted on the shaft for axial sliding movement and having a piston-aligning member with a piston-engaging portion that extends in a plane parallel to the plane of said piston-supporting surface and at right angles to the axis of the arbor.

5. A machine of the kind described having a base with a piston-supporting surface, an arbor on the base, a shaft on the base, the axis of which is in a plane parallel to said piston-supporting surface, the axes of said arbor and shaft being in vertical planes that intersect each other at right angles, and a bracket mounted on the shaft for pivotal movement and having a piston-aligning member with a piston-engaging portion that extends in a plane parallel to the plane of said piston-supporting surface and at right angles to the axis of the arbor.

6. The structure defined in claim 5 in which said bracket has a joint permitting said piston-aligning member to be angularly adjusted in respect to the piston supporting surface.

In testimony whereof I affix my signature.

WILLIAM AAB.